March 31, 1970     S. S. JACKEL     3,503,343

METHOD AND APPARATUS FOR MAKING CONTINUOUS MIX BREAD

Filed April 21, 1967     2 Sheets-Sheet 1

INVENTOR
SIMON S. JACKEL

BY Larson and Taylor
ATTORNEYS

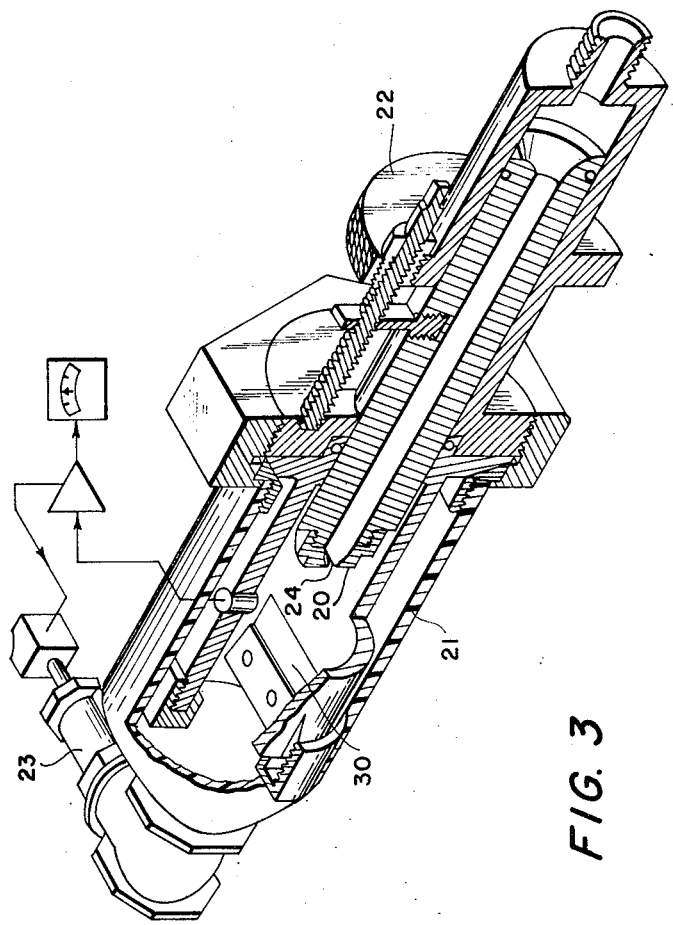

United States Patent Office 3,503,343
Patented Mar. 31, 1970

3,503,343
METHOD AND APPARATUS FOR MAKING CONTINUOUS MIX BREAD
Simon S. Jackel, Scarsdale, N.Y., assignor, by mesne assignments, to Baker Research Development Service Inc., New York, N.Y., a corporation of New York
Filed Apr. 21, 1967, Ser. No. 632,767
Int. Cl. A21c 1/00
U.S. Cl. 107—30
11 Claims

ABSTRACT OF THE DISCLOSURE

The use of a vibratory device to increase throughput or reduce operating temperature of the continuous mix breadmaking process. The vibratory unit may be of the ultrasonic type known as a liquid whistle. The unit is used between the pre-mixing and developing zones of a continuous mix breadmaking operation.

SPECIFICATION

This invention relates to a method and apparatus for the continuous mix process of making bread. More particularly, the invention relates to the utilization of a mixing device to improve the continuous breakmaking process. Still more particularly, the invention relates to the use of an ultrasonic vibratory mixing device to increase throughput and reduce operating temperature of a continuous mix breadmaking process.

The continuous mix process for making bread has been well known for many years and a substantial amount of bread sold at the present time is made by this process. A principal characteristic of the continuous process, as opposed to the conventional sponge-dough process, is that it does not make use of the mellowing effect of sponge or dough fermentation. A liquid ferment is set containing the yeast and yeast nutrients in order to obtain an active fermentation and to develop flavor. This broth is then continuously proportioned into the permixer of the breadmaking apparatus along with the flour and other ingredients. In the premixer, the ingredients are thoroughly mixed but not developed. The pre-mixed dough is then continuously fed into a developer where the dough is vigorously worked to such a point that the gluten structure loses a good deal of its elastic properties. The dough becomes fully developed and has greater gas-cell-retention properties than in the pre-mixed condition. The continuous mix breadmaking process has been widely described in the literature and is the subject of U.S. Patent No. 2,953,460, issued Sept. 20, 1960 to John C. Baker.

While the contonuous mix process as described by Baker has been in successful commercial operation for many years, the art has been occupied with extensive research seeking to improve upon the basic process. See, for example, "Cereal Science Today," vol. 9, No. 7, September 1964, which is substantially entirely devoted to then-recent efforts in the area.

The present invention constitutes an improvement in the continuous mix operation in that, in accordance with the invention, throughput using existing equipment can be substantially increased, operating temperature can be reduced, mixing requirements can be reduced, or the process can be operated to take advantage of two or more of these results in combination. According to the invention, at least part of the pre-mixed dough formed in the usual continuous mix process is subjected to ultrasonic vibrations prior to development. The dough is forced through a nozzle to form a stream and the stream of pre-mixed dough is impinged upon a vibratory member which is caused to vibrate by the impingement of said stream thereon and which thus subjects the stream of pre-mixed dough to the violent mixing action of the vibrating element. This dough is then returned to the developing section of the apparatus and the process completed by discharging the dough into loaves of developed bread. By processing the dough in this manner, it was discovered that developing requirements were substantially reduced. Furthermore, the grain, texture, flavor and mouthfeel of the bread product was at least as good as the old product. Since the throughput of a given piece of breadmaking equipment is limited by the developing requirement, the invention makes possible, without changing the developing requirements, a substantial increase in throughput. On the other hand, the temperature of the developing operation can be substantially reduced by developing at lower mixing speed with no increase in throughput and this makes possible obtaining final dough having lower temperatures at customary commercial throughput rates. The lower temperature permits variations and improvement in flavor and other properties such as grain, texture and sidewall strength.

Accordingly, it is an object of the present invention to provide an improved method and apparatus for making continuous mix bread. It is a further object of the invention to provide such a method and apparatus where the developer requirements for a continuous mix breadmaking operation are reduced. It is still a further object of the invention to provide such a method whereby throughput can be increased, mixing requirements reduced, dough temperature reduced, or a combination of two or more of these results are achieved.

These and other objects are achieved according to the invention by utilizing an ultrasonic vibratory mixing device between the pre-mixer and developing zones of a continuous breadmaking machine and by subjecting at least part of the pre-mixed dough to the action thereof prior to development.

The invention will be described in greater detail in the following specification which includes the drawings wherein:

FIGURE 3 is a perspective sectional view of the nozzle and vibrator element shown generally in FIGURE 1.

Figure 1:
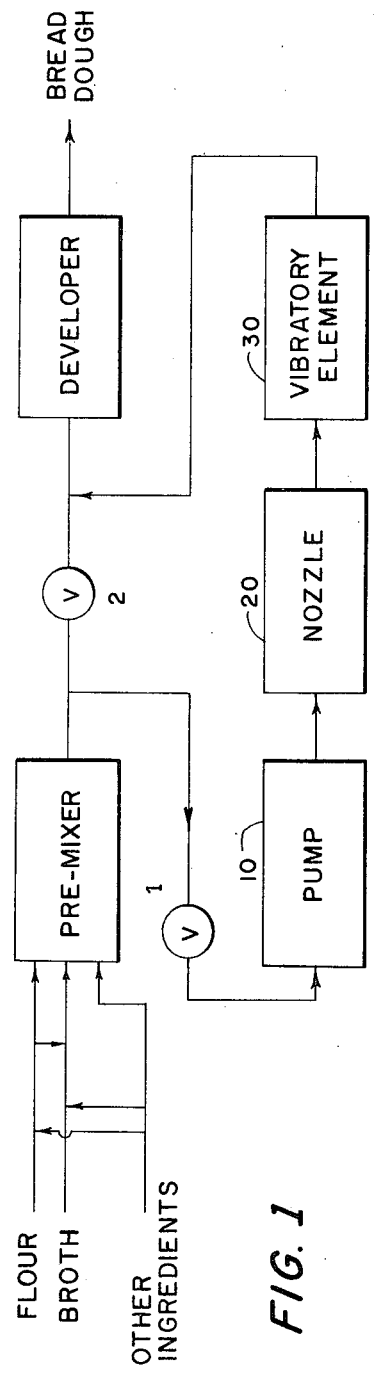
FIGURE 1 is a flowsheet of an improved continuous mix breadmaking process according to the invention.

As shown diagrammatically in FIGURE 1, the continuous mix operation is conducted in the usual equipment which may be of laboratory or commercial size. The equipment includes storage and metering means to feed the dough ingredients to the pre-mixer. Optionally, ingredients can be blended or mixed together prior to pre-mixing. The ingredients basically include flour and the liquid ferment and may include separate feeds of sugar solution, shortening, oxidant solution, water, etc. The liquid ferment (also called "brew" or "broth") generally includes water, yeast, sugar, yeast nutrient and up to 60% or more of the fluor all as known per se in the art and particularly in the Baker patent which is incorporated herein by reference.

The pre-mixing step involves a simple blending operation whereby the dough ingredients are advanced and combined in an open mixing vessel to produce a dough of uniform composition entirely wet and free of lumps and to allow occluded or trapped gases to escape. The agitation for premixing, such as simple stirring, is preferably such that there is no appreciable folding, convolution or beating which would tend to entrap atmospheric air. This can be accomplished by stirring and advancing the ingredients in a linear direction with a revolving helical element as disclosed by Baker. The mixing is of a preliminary sort, and the dough is not developed.

The developer comprises a closed container, as shown by Baker, which includes mixing elements operable at independently controllable speeds for the desired regulation of development and maintenance of dough output of constant quality and characteristics in a manner independent of the rate of dough advance. The mixing elements may include a double impeller arrangement of counter-rotating blades which closely mesh as shown by Baker.

In accordance with the present invention, at least a portion of the pre-mixed dough is subjected to ultrasonic vibration, in a manner to be described in detail, prior to being introduced into the developer. As shown in FIGURE 1, valves 1 and 2 can be manipulated to shunt some or all of the pre-mixed dough so as to be subjected successively to the action of a pump 10, a nozzle 20, and a vibratory element 30 prior to being introduced into the developer. Alternatively, all of the pre-mixed dough may be subjected to the action of the pump, nozzle and vibratory element units in which case the valves are dispensed with an the units are simply connected between the pre-mixer and developer.

In either event, however, neither the basic apparatus nor the process for making continuous mix bread is altered, conventional techniques and equipment for formulation of the dough and operation of the pre-mixer and developer being perfectly suitable.

A Wallace and Tiernan Do-Maker pilot size unit was employed to compare bread made by the usual continuous mix process with that made according to the present invention.

The bread formulation is shown in Table I.

TABLE I

|  | Percent [1] | Grams |
| --- | --- | --- |
| Flour | 100.00 | 5,200 |
| Water | 68.00 | 3,536.0 |
| Suger | 8.00 | 4,6 |
| Salt | 2.25 | 117.0 |
| Milk solids | 3.00 | 156.0 |
| Yeast food | 0.5 | 26.0 |
| Calcium acid phosphate | 0.1 | 5.2 |
| Calcium propionate | 0.1 | 5.2 |
| Yeast | 2.5 | 130.0 |
| Shortening blend: |  |  |
| Lard | 2.64 | 137.28 |
| Cotton seed flakes | 0.14 | 7.28 |
| Emulsifier | 0.22 | 11.44 |
|  | 3.00 | 156.00 |

Oxidation solution:
Potassium iodate ($KIO_3$)—12.5 parts per million, 52 ml.
Potassium bromate ($KBrO_3$)—50.0 parts per million, 52 ml.
[1] All percentages are based on the flour weight.

The control bread is made by the liquid ferment or Do-Maker process. The ingredients shown in Table II are used for the broth (liquid ferment) preparation.

TABLE II

|  | Percent |
| --- | --- |
| Water | 67.0 |
| Sugar | 8.0 |
| Salt | 2.25 |
| Milk solids | 3.0 |
| Yeast food | 0.5 |
| CAP | 0.1 |
| Ca-propionate | 0.1 |
| Yeast | 2.5 |

The broth is fermented at about 86° F. for about two and one half hours with stirring. After the fermentation period, the broth and the remaining ingredients are combined in a 30 quart Hobart mixer in the proportion shown in Table III.

TABLE III

Flour—100.0%
Broth—As in Table II (4287 gm.)
Shortening blend—3.0%
Oxidation solution—As in Table I (52 ml.)

These ingredients are mixed in the Hobart mixer for 45 seconds at low speed, and 15 seconds at medium speed. Solid and liquid materials are incorporated until the total mass is sufficiently mixed to have no obvious dry lumps or unusually soft portions. The pre-mixed dough has a granular appearance; it is smeary and breaks when pulled.

This complete dough was then transferred to the cylinder of the pilot Do-Maker continuous mix unit. Here it was extruded under the pressures of a water driven ram through a high speed mixing chamber at a rate of about 3 pounds of dough per minute. Pound lots of dough were collected in standard baking pans for baking 18 minutes ta 425° F. and the developer requirement was 200 r.p.m.

Figure 2:
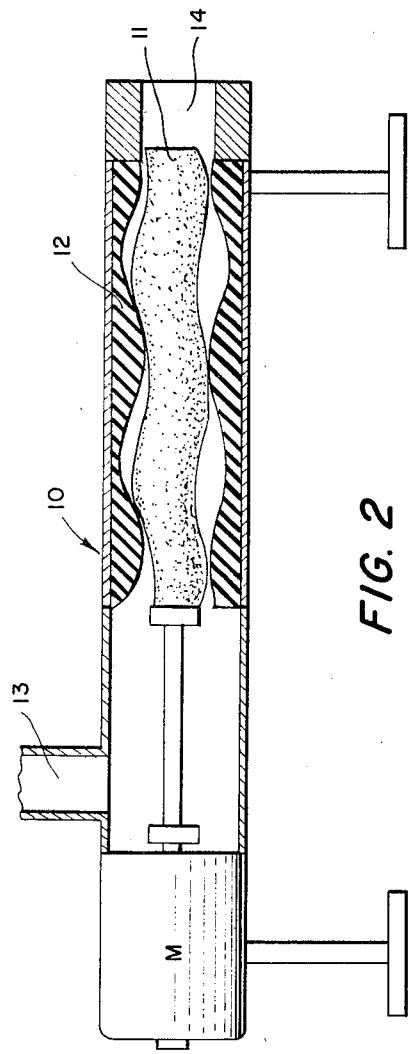
FIGURE 2 is a sectional view of the pump, shown generally in FIGURE 1.

Using the identical formulation and pre-mix operation, the pre-mixed dough was fed to a pump and thence to an ultrasonic vibrator device comprising a nozzle and vibrating element according to the present invention. As will be seen in FIGURE 2, the pump utilized is a positive dsplacement screw conveyor type of pump. (A Monyo pump, having a 4 inch mouth was used.) The pump includes a motor M which turns a screw type rotor 11 inside a stator 12. The rotor is conveniently metal and the stator is a plastic or rubber material. The stator includes a helical valley which cooperates with the rotating screw to push the dough forward from inlet 13 to outlet 14 at pressures of up to 500 p.s.i. and higher. The pump can be sized according to need and is preferably over-sized such that the output can be controlled by simply varying the speed of rotation. The output pressure is essentially independent of speed and can be selected when the pump is sized. The pump is sized to produce a pressure high enough to force the dough through a nozzle to form a stream of pre-mixed dough.

The dough is pumped through an orifice 24 in a nozzle element 20. The size and configuration of the orifice can vary widely but a generally longitudinal slit is preferred, particularly where a blade-like vibrating element is employed. The slit is sized to give the dough stream moderate velocity which, of course, depends on the output pressure characteristics of the pump 10. Pumps having high output pressures are readily available and, consequently, the slit can be sized to give desired throughput.

The dough stream passing through the nozzle orifice is then subjected to the action of an ultrasonic vibrating device comprising a vibratory blade element on which the stream impinges. Ultrasonic vibratory devices of this type are known and have been described, inter alia, in U.S. Patent Nos. 2,657,021; Re. 25,324; and 3,176,964. While the devices can vary in specific design as mentioned in the patents, their essential elements include a vibratory element 30 spaced from a nozzle to receive a jet or stream of material from the nozzle. Details of such a device, including the nozzle, are shown in FIGURE 3. The material is forced through the orifice which is longitudinal and thus emerges as a flat jet or stream of dough. This stream impinges upon a vibratory blade element adjustably spaced from the nozzle orifice. The free edge of the blade is disposed generally parallel to the nozzle orifice slit and is thus disposed across, or transverse, the dough stream. The dough stream passes on either side of the vibratory blade and this causes the blade to vibrate which in turn causes intense ultrasonic vibration within the material itself. Cacitation takes place continuously, producing violent local pressure changes which produce high intensity mixing forces. The nozzle and vibratory element are conveniently mounted in a housing 21 which includes knurled knob 22 and associated parts to adjust the distance therebetween and a valve 23 to adjust the pressure in the housing as shown in FIGURE 3, which is similar to FIGURE 1 of Cottell, U.S. Patent No. 3,176,964, and more fully described therein.

After leaving the vibrator unit, the dough is developed and requires less development than the control. The exit pressure from the vibratory unit is usually sufficient to convey the dough to the developer and, if not, an auxiliary pump can be used. In the instant example, the same throughput of dough (3.00 pounds/min.) was fully developed at only 160 r.p.m. developer mixer speed and yielded bread at least as good as the control. In some cases, the bread was superior in grain and texture and there was some indication of improved flavor and improvement in body and side wall strength due to the lower temperature of operation. The dough did warm up in the vibratory unit, but the final dough temperature, upon leaving the developer, can be kept as low as 85–95 ° F. whereas the control dough was about 105° F.

While the mixing speed requirement can be reduced at the throughput rate of the control, if the mixing speed is kept at the rate of the control, throughput will be increased in this case up to about 3.75 pounds/min. Even in this case, however, the dough temperature can be as much as 10–15° F. lower than that of the control. It will be apparent, therefore, that the process parameters can be varied widely and that two or more of the stated variables (mixing speed, throughput rate, and dough temperature) can be manipulated simultaneously to give a desired effect.

Large sized operations according to the invention are also quite feasible. At present, commercial units do not exceed production rates of 7500 pounds of dough per hour and generally operate at a much lower rate. High pressure conveyor pumps and vibratory units of the type mentioned, however, are available in sufficient size such that the results obtained in the pilot equipment are available in large scale equipment.

From the foregoing it will be apparent that not all of the pre-mixed dough is required to be subjected to ultrasonic vibration prior to development. Accordingly, some of the pre-mixed dough can be directly developed and the developing requirement and temperature will be reduced to an extent dependent upon the amount of pre-mixed dough which is subjected to ultrasonic vibration. Generally speaking, at least 50% of the pre-mixed dough is subjected to ultrasonic vibration.

While the foregoing detailed description is directed to the standard continuous mix process, the invention is also applicable to variations thereof and is generally applicable to reduce the developer requirements of incompletely developed dough which is processed in continuous mix equipment. For example, the invention is applicable to improve the developing requirements of a modification of the continuous mix process described in Bakery Production and Marketing, January 1967, pp. 22–28. In this process, a conventional set sponge is blended with remaining flour in the pre-mixer and the pre-mixed dough is then processed in the developing zone of a continuous mix machine. The dough sponge contains less than the total requirement of flour, generally requiring up to 50% more flour and typically 30% more as mentioned in the literature article. The set sponge and remaining flour are blended in the pre-mixer and this process yields bread of superior flavor, eating qualities, resiliency, sidewall strength, crumb and other properties. These improved properties are attributed in part to the lower final dough temperatures reached in the modified process and these temperatures can be reduced still further according to the present invention by subjecting at least part of the pre-mixed dough to ultrasonic vibration as mentioned in connection with the conventional continuous mix operation. Generally, only flour is added in the pre-mix blending step, but oxidation may also be added at that point.

I claim:

1. In a method of making bread by the continuous mix process wherein the bread ingredients, including a liquid ferment, are blended in a pre-mixing zone to form a pre-mixed dough lacking effective development and the pre-mixed dought is subsequently continuously worked to provide developed dough having greater gas-cell-retention properties than in the pre-mixed dough, the improvement which comprises subjecting at least part of the pre-mixed dough to ultrasonic vibraton, and returning the dough to the continuous mix process to be continuously worked to developed dough.

2. In a method of making continuous mix bread according to claim 1, the improvement which comprises forcing at least some of said pre-mixed dough through a nozzle to produce a stream of said pre-mixed dough, impinging said stream of dough on a vibratory element positioned across said jet to subject said pre-mixed dough to the violent vibrations of said vibrating element caused by the impingent of said pre-mixed dough thereon, and returning the dough to the continuous mix process to be continuously worked to developed dough.

3. In a method of making continuous mix bread according to claim 2 the improvement wherein the vibratory element comprises a blade having a vibrating edge disposed across said stream of pre-mixed dough.

4. In apparatus for making continuous mix bread including pre-mixing means to blend bread ingredients into a pre-mixed dough and developing means to develop said pre-mixed dough, the improvement which comprises ultrasonic vibration means to subject at least part of the pre-mixed dough to ultrasonic vibrations prior to development.

5. In apparatus according to claim 4, the improvement wherein said ultrasonic vibration means comprises nozzle means, means to force at least a part of the pre-mixed dough through said nozzle means to form a stream of said dough, a vibratory element positioned to encounter said stream whereby said element is caused to vibrate upon impingement by said stream to subject said dough to violent vibratory action of said element, and wherein said apparatus includes means to return said vibrated dough to said developing means.

6. In apparatus for making continuous mix bread according to claim 5, the improvement wherein said nozzle means comprises a generally longitudinal orifice and said vibrating element comprises a blade having a vibratory edge facing and generally parallel to said longitudinal orifice.

7. In apparatus for making continuous mix bread according to claim 6, the improvement further including means to adjust the distance between said orifice and said blade edge.

8. In apparatus for making continuous mix bread according to claim 5, the improvement wherein said nozzle means comprises an orifice and further comprising a housing surrounding said orifice and said vibratory means, said housing including outlet means for vibrated dough.

9. In apparatus for making continuous mix dough according to claim 8, the improvement further including means to adjust the pressure of the stream surrounding said vibratory element.

10. In a method of making bread wherein incompletely developed dough is continuously worked in a closed developing zone to provide developed dough having greater gas cell-retention properties than in the incompletely developed dough, the improvement which comprises subjecting at least part of the incompletely developed dough to ultrasonic vibration prior to continuously working the dough in said closed developing zone.

11. A method according to claim 10 wherein the incompletely developed dough is provided by blending a set sponge dough containing less than the total flour required for the bread with the balance of said flour in a pre-mixing zone.

References Cited

UNITED STATES PATENTS

| Re. 25,324 | 1/1963 | Cottell | 259—1 |
| 2,953,460 | 9/1960 | Baker | 99—90 |
| 3,176,964 | 4/1965 | Cottell et al. | |
| 3,321,189 | 5/1967 | Scarpa | 259—1 XR |

DANIEL BLUM, Primary Examiner

U.S. Cl. X.R.

99—90; 107—54; 259—1